United States Patent
Jeon

(10) Patent No.: US 9,128,814 B2
(45) Date of Patent: Sep. 8, 2015

(54) EVALUATION METHOD FOR A SHIFT FEELING OF A VEHICLE

(71) Applicant: Hyundai Motor Company, Seoul (KR)

(72) Inventor: Byeong Wook Jeon, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 215 days.

(21) Appl. No.: 13/712,882

(22) Filed: Dec. 12, 2012

(65) Prior Publication Data

US 2014/0088789 A1 Mar. 27, 2014

(30) Foreign Application Priority Data

Sep. 24, 2012 (KR) .................. 10-2012-0105676

(51) Int. Cl.
| | |
|---|---|
| G06F 17/00 | (2006.01) |
| B60W 10/04 | (2006.01) |
| B60W 10/10 | (2012.01) |
| B60W 30/19 | (2012.01) |

(52) U.S. Cl.
CPC ............... *G06F 17/00* (2013.01); *B60W 30/19* (2013.01)

(58) Field of Classification Search
CPC ............................... G06F 17/00; B60W 30/19
USPC ..................... 701/1, 2, 51; 477/107
See application file for complete search history.

(56) References Cited

U.S. PATENT DOCUMENTS

| | | | | |
|---|---|---|---|---|
| 3,783,974 A | * | 1/1974 | Gilbert et al. | 187/295 |
| 5,470,289 A | * | 11/1995 | Pioch et al. | 477/111 |
| 5,483,446 A | * | 1/1996 | Momose et al. | 701/1 |
| 5,658,217 A | * | 8/1997 | Tsukada | 477/109 |
| 6,529,816 B1 | * | 3/2003 | Yamaguchi et al. | 701/110 |
| 6,961,647 B2 | * | 11/2005 | Matsumura et al. | 701/55 |
| 7,902,969 B2 | | 3/2011 | Obradovich | |
| 8,190,347 B2 | * | 5/2012 | Nakai et al. | 701/96 |
| 8,485,942 B2 | * | 7/2013 | Matsushita et al. | 477/120 |
| 8,532,896 B2 | * | 9/2013 | Braunberger et al. | 701/70 |
| 2002/0035009 A1 | * | 3/2002 | Saito | 477/50 |
| 2002/0068662 A1 | * | 6/2002 | Jeon | 477/141 |
| 2004/0034461 A1 | * | 2/2004 | Kadota | 701/67 |
| 2004/0242374 A1 | * | 12/2004 | Wheals | 477/120 |
| 2008/0312035 A1 | * | 12/2008 | Murayama et al. | 477/110 |
| 2009/0043428 A1 | * | 2/2009 | Matsunaga et al. | 701/1 |

(Continued)

FOREIGN PATENT DOCUMENTS

| | | |
|---|---|---|
| JP | 8-500561 A | 1/1996 |
| JP | 2007-55320 A | 3/2007 |

(Continued)

OTHER PUBLICATIONS

Byeong Wook Jeon and Sang-Hwan Kim, A Study on the Quantitative Perceived Shift Quality Metric of Automatic Transmission Applying Human Factors Methods; Korea Society of Automotive Engineers Workshop, pp. 263-269, vol. 2012 No. 11, Korea.

Byeong Wook Jeon, Introduction of Quantitative Measuring Methods for Objective Shift Quality Evaluation, Auto Journal, Aug. 2013, pp. 16-24, Korea.

*Primary Examiner* — Fadey Jabr
*Assistant Examiner* — Angelina Shudy
(74) *Attorney, Agent, or Firm* — Morgan, Lewis & Bockius LLP

(57) ABSTRACT

An evaluation method for a shift feeling of a vehicle, through which the shift feeling during a kick down operation of a driver is deduced as objectively quantitative value, it may be applied to a proper shift control corresponding to an expectancy of a driver based on the quantitative value.

6 Claims, 5 Drawing Sheets

(56) References Cited

U.S. PATENT DOCUMENTS

| | | | |
|---|---|---|---|
| 2009/0287374 A1* | 11/2009 | Kuramori et al. | 701/41 |
| 2011/0118929 A1* | 5/2011 | Takae et al. | 701/29 |
| 2012/0316032 A1* | 12/2012 | Matsushita et al. | 477/120 |
| 2013/0150213 A1* | 6/2013 | Chae et al. | 477/182 |
| 2014/0081540 A1* | 3/2014 | Jeon | 701/58 |
| 2014/0162840 A1* | 6/2014 | Kim et al. | 477/5 |

FOREIGN PATENT DOCUMENTS

| | | |
|---|---|---|
| JP | 2007-276708 A | 10/2007 |
| WO | WO 95/00356 A1 | 1/1995 |
| WO | WO 02/092379 A1 | 11/2002 |

* cited by examiner

| No | Variables | | Description | Unit |
|---|---|---|---|---|
| 1 | $X_1$ | $T_1$ | G(@ Tip-in) + 0.02 G TIME PERIOD | msec |
| 2 | $X_2$ | $T_2$ | G(@ Tip-in) ~ G peak TIME PERIOD | msec |
| 3 | $X_3$ | $G_1$ | G AVERAGE DURING 0.5 SEC FROM G peak +150ms | $m/sec^2$ |
| 4 | $X_4$ | $\Delta G$ | SLOPE OF G+0.02~G peak | $m/sec^3$ |
| 5 | $X_5$ | $J_1$ | FIRST EFFECTIVE PEAK JERK AFTER TIP-IN | $m/sec^3$ |
| 6 | $X_6$ | $J_2$ | EFFECTIVE PEAK JERK AFTER G peak | $m/sec^3$ |

*FIG. 3*

| Coefficient | Sporty K/D | | | |
|---|---|---|---|---|
| | RESPONSIVENESS | STRENGTH | SMOOTHNESS | UNPERCEIVABLE |
| $a_1$ | 4.35000 | −23.13000 | 13.57000 | 22.07000 |
| $a_2$ | 1.80600 | 1.64400 | 4.83800 | 7.52900 |
| $a_3$ | 103.02000 | 157.57000 | 51.99000 | −26.61000 |
| $a_4$ | −22.24000 | −13.80100 | −9.20000 | 6.10000 |
| $a_5$ | −19.54300 | −10.09800 | −7.87300 | −4.40000 |
| $a_6$ | 17.14800 | 6.77400 | 4.59400 | 3.04000 |
| $k_s$ | 62.99000 | 54.17000 | 94.30000 | 67.02000 |
| Coefficient | Mlid K/D | | | |
| | RESPONSIVENESS | STRENGTH | SMOOTHNESS | UNPERCEIVABLE |
| $b_1$ | −21.84000 | −28.12000 | 0.33000 | −17.11000 |
| $b_2$ | −11.51200 | −8.23000 | −3.27600 | −10.05600 |
| $b_3$ | −9.63000 | 8.57000 | −28.41000 | −24.41000 |
| $b_4$ | −0.74200 | 2.74000 | 5.39200 | 4.73900 |
| $b_5$ | 13.18000 | 12.69600 | 1.81400 | −6.74000 |
| $b_6$ | 16.80000 | 15.20000 | −12.64000 | −35.9900 |
| $k_m$ | 99.82000 | 82.46000 | 90.17000 | 69.63000 |

FIG. 4

| SENSORY FACTOR | Coefficient | Sporty K/D | Coefficient | Mild K/D |
|---|---|---|---|---|
| RESPONSIVENESS | $c_1$ | 0.335 | $d_1$ | 0.263 |
| STRENGTH | $c_2$ | 0.335 | $d_2$ | 0.274 |
| SMOOTHNESS | $c_3$ | 0.199 | $d_3$ | 0.269 |
| UNPERCEIVABLE | $c_4$ | 0.131 | $d_4$ | 0.194 |

*FIG. 5*

EVALUATION METHOD FOR A SHIFT FEELING OF A VEHICLE

CROSS-REFERENCE TO RELATED APPLICATION

The present application claims priority of Korean Patent Application Number 10-2012-0105676 filed Sep. 24, 2012, the entire contents of which application is incorporated herein for all purposes by this reference.

BACKGROUND OF INVENTION

1. Field of Invention

The present invention relates to an evaluation method for a shift feeling of a vehicle, and more particularly, to a base technology for evaluating quantitatively a shift feeling of a vehicle mounted with an automated transmission and implementing objectively and properly shift control.

2. Description of Related Art

Generally, a vehicle mounted with an automated transmission has a mechanism in which a shift control is performed commonly through hydraulic control and its final object is to allow an occupant to feel excellent shift feeling.

Accordingly, in order to meet properly a demand of the occupant through the shift control, first, the shift feeling with respect to behavior of a vehicle produced when a vehicle is shifted, which is felt subjectively by the occupant, has to be expressed objectively and quantitatively.

In a related art, a method for expressing the shift feeling has been used, in which the impact felt by a human from a variation amount of front-rearward G value of an acceleration sensor mounted in a vehicle is determined qualitatively.

However, since a very smooth acceleration variation amount is to be felt as an acceleration delay feeling, it is unreasonable that a shift feeling control target is to set by handling the acceleration variation amount as a shift property, and an acceleration desolate feeling or shift impact is to be felt when prompt response time of the shift is attempted only. Accordingly, it means that in the shift feeling for satisfying human smoothness and fastening feeling may be mixed and existed to some extents. However, a reference of "acceleration variation giving proper fastening feeling" is very sensory and thus its target value setting using a prior mechanical engineering method is limited.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for an evaluation method of a shift feeling in which a shift feeling felt by an occupant when a vehicle is accelerated-shifted is quantified objectively by using human sensibility ergonomic concept and more proper and optimal shifting feeling control is possible based on the quantified shift feeling.

According to one aspect of the present invention, an evaluation method for a shift feeling of a vehicle including: a measurement factor detecting step for detecting a total 6 measurement factors of an initial acceleration response time X1, a final acceleration arriving time X2, an average acceleration maintaining amount during a predetermined time period after arriving a maximum acceleration X3, an acceleration rising slope X4, an initial maximum jerk X5 and an end maximum jerk X6, from front and rearward acceleration signal of a vehicle; a sensor factor calculation step for calculating a major four sensory factors of a responsiveness, a strength, a smoothness and an unperceivable by multiplying the 6 measurement factors by different arithmetic coefficients, respectively, and summating them; and a sensory score calculation step S30 for obtaining a total sensory score by multiplying the four major sensory factors by different weighted values, respectively and summating them.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 3 is a table showing 6 measurement factors which are detected from acceleration signal in front and rear direction of a vehicle according to the present invention;

FIG. 4 is a table showing an example of arithmetic coefficients which are used in a sensory factor calculation step according to the present invention; and FIG. 5 is a table showing an example of weighted values which are used in a sensory score calculation step according to the present invention.

Figure 1:
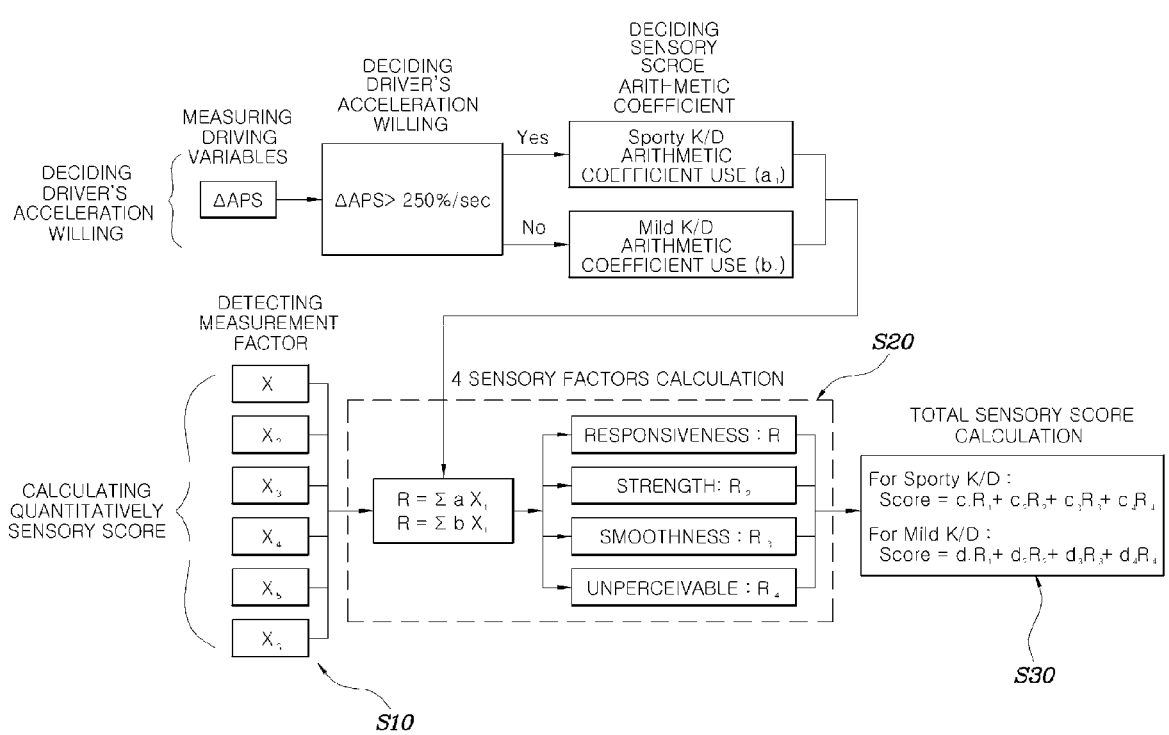
FIG. 1 is a block diagram illustrating an evaluation method for a shift feeling of a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Figure 2:
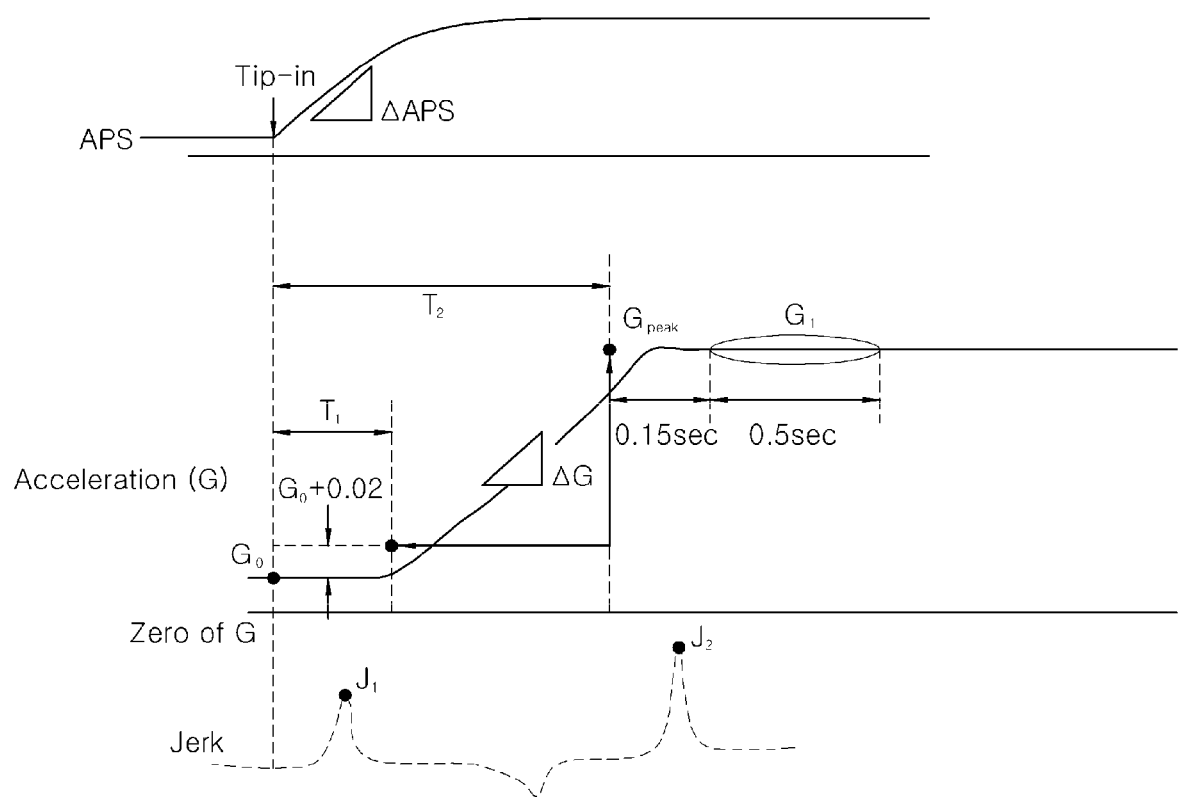
FIG. 2 is a graph illustrating 6 measurement factors which are detected from acceleration signal in front and rear direction of a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 5, an evaluation method for a shift feeling of a vehicle according to the present invention includes: a measurement factor detecting step S10 for detecting a total 6 measurement factors of an initial acceleration response time X1, a final acceleration arriving time X2, an average acceleration maintaining amount during a predetermined time period after arriving a maximum acceleration X3, an acceleration rising slope X4, an initial maximum jerk X5 and an end maximum jerk X6, from front and rearward acceleration signal of a vehicle; a sensor factor calculation step S20 for calculating a major four sensory factors of a responsiveness, a strength, a smoothness and an unperceivable by multiplying the 6 measurement factors by different arithmetic coefficients, respectively, and summating them; and a sensory score calculation step S30 for obtaining a total sensory score by multiplying the four major sensory factors by different weighted values, respectively and summating them.

That is, the four major sensory factors of a responsiveness, a strength, a smoothness and an unperceivable are calculated by multiplying the six factors extracted from the front and rearward acceleration in accordance to an operation of an acceleration pedal by a driver in a vehicle mounted with an automated transmission, by the different arithmetic coefficients, respectively, and summating them, and the total sensory score is obtained eventually by giving weighted value to them thereby expressing the shift feeling felt by the driver with objectively quantified value.

In various embodiments, each of the sensor factor calculation step S20 and the sensor score calculation step S30 is performed per a sporty kick down and a mild kick down of a driver wherein the sporty kick down and the mild kick down are sorted by a variation of accelerator pedal sensor signal (APS) as time lapses.

The reason for classifying acceleration state as the sporty kick down and the mild kick down is that since response linearity with respect to psychological expectancy of a driver is very important, a calculation modeling for sensor score may be sorted per driving willing in order to reflect sufficiently expectancy psychology of a human and thus the driver's willing is sorted as the sporty kick down and the mild kick down in various embodiments.

In the sorting of the sporty kick down and the mild kick down, when a variation of the accelerator pedal sensor signal per time exceeds to 250%±50%/sec, it may be determined as the sporty kick down, and when it is 250%±50%/sec or less, it may be determined as the mild kick down in accordance to a plurality of experiment and statistics wherein 250%±50%/sec is referred in various embodiments.

Among the four major sensory factors, the responsiveness indicate whether a vehicle responds as rapidly much as a driver's willing, the strength indicates whether a power feeling is enough when the vehicle accelerates, the smoothness indicates whether an acceleration rising is smooth, and the unperceivable indicates whether there is no unpleasant vibration when a vehicle accelerates, and as a result, the four major factors are considered in the present invention, which affect most importantly to sensory target of a shift feeling felt by a driver.

Meanwhile, among the six measurement factors, the initial acceleration response time $X_1$ is a time required $T_1$ from an acceleration at a tip-in time point where a driver steps down an acceleration pedal to a time point where the acceleration is increased to a predetermined rate, the final acceleration arriving time $X_2$ is a time required $T_2$ from the tip-in time point of a driver to a time required to arrive a maximum acceleration, the average acceleration maintaining amount during a predetermined time period after arriving a maximum acceleration $X_3$ is an acceleration average value $G_1$ for a predetermined time period after arriving the maximum acceleration, the acceleration rising slop $X_4$ is an acceleration slope G from $T_1$ to $T_2$, the initial maximum jerk $X_5$ is a first effective peak jerk after tip-in of a driver, and the end maximum jerk $X_6$ is an effective peak jerk after $T_2$.

Here, the predetermined rate at which the acceleration increases from the acceleration at the tip-in time point, which is necessary to determine the initial acceleration response time $X_1$, is a range of 0.02±0.01 of the acceleration at a tip-in time, and the predetermined time period, which is necessary to determine the average acceleration maintaining amount during a predetermined time period after arriving a maximum acceleration $X_3$ may be a range of 0.5±0.2 sec after 150±50 ms after arriving the maximum acceleration, and in various embodiments, the predetermined rate is 0.02 times the acceleration at the tip-in time point, and the predetermined time period is 0.5 sec after 150 ms after arriving the maximum acceleration.

Practically, in the sensory factor calculation step S20, the four major sensory factors are calculated by arithmetic coefficients as shown in FIG. 4 in accordance to the conditions of the sporty kick down and the mild kick down with respect to the six factors obtained as described-above as followings.

1. Sporty Kick Down Condition

Responsiveness point: $R_1 = a_1 X_1 + a_2 X_2 + a_3 X_3 + a_4 X_4 + a_5 X_5 + a_6 X_6 + k_s$ Strength point: $R_2 = a_1 X_1 + a_2 X_2 + a_3 X_3 + a_4 X_4 + a_5 X_5 + a_6 X_6 + k_s$ Smoothness point: $R_3 = a_1 X_1 + a_2 X_2 + a_3 X_3 + a_4 X_4 + a_5 X_5 + a_6 X_6 + k_s$ Unperceivable point: $R_4 = a_1 X_1 + a_2 X_2 + a_3 X_3 + a_4 X_4 + a_5 X_5 + a_6 X_6 + k_s$ 2. Mild Kick Down Condition Responsiveness point: $R_1 = b_1 X_1 + b_2 X_2 + b_3 X_3 + b_4 X_4 + b_5 X_5 + b_6 X_6 + k_m$ Strength point: $R_2 = b_1 X_1 + b_2 X_2 + b_3 X_3 + b_4 X_4 + b_5 X_5 + b_6 X_6 + k_m$ Smoothness point: $R_3 = b_1 X_1 + b_2 X_2 + b_3 X_3 + b_4 X_4 + b_5 X_5 + b_6 X_6 + k_m$ Unperceivable point: $R_4 = b_1 X_1 + b_2 X_2 + b_3 X_3 + b_4 X_4 + b_5 X_5 + b_6 X_6 + k_m$ Here, ks and km refers to an intercept to meet the units of the respective items when it is modeled, the arithmetic coefficients are values calculated statistically human sensibility ergonomic experiments.

With respect to the four major sensory factors obtained as described-above, the final total sensory scores are obtained in the sensory score calculation step S30 by multiplying the factors by the different weighted values and summating them as shown in FIG. 5, which are sorted in accordance to the sporty kick down or the mild kick down, using the following formula.

1. Sporty Kick Down Condition

Total sensory score: $Score = c_1 R_1 + c_2 R_2 + c_3 R_3 + c_4 R_4$

2. Mild Kick Down Condition

Total sensory score: $Score = d_1 R_1 + d_2 R_2 + d_3 R_3 + d_4 R_4$

Here, the weighted value is calculated statistically through human sensibility ergonomic experiments and the weighted values indicate how much the respective major sensory factors attribute the total sensory scores obtained from measured physical quantity.

As described-above, when the shift feeling during a kick down operation of a driver is deduced as objectively quantitative value, it may be applied to a proper shift control corresponding to an expectancy of a driver based on the quantitative value.

Meanwhile, the evaluation method for a shift feeling may be implemented by electronic unit that performs the functions as described-above.

According to the present invention, the shift feeling during a kick down operation of a driver can be deduced as objectively quantitative value, it may be applied to a proper shift control corresponding to an expectancy of a driver based on the quantitative value.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An evaluation method implemented in an electronic control unit of a vehicle for evaluating a shift feeling of the vehicle, the method comprising:
   detecting six measurement factors of an initial acceleration response time X1, a final acceleration arriving time X2, an average acceleration maintaining amount during a predetermined time period after arriving a maximum acceleration X3, an acceleration rising slope X4, an initial maximum jerk X5 and an end maximum jerk X6, from a front and rearward acceleration signal of the vehicle;
   calculating four major sensory factors of a responsiveness, a strength, a smoothness and an unperceivable by multiplying the six measurement factors by respective arithmetic coefficients, and summating the six measurement factors multiplied by the respective arithmetic coefficients;
   obtaining a total sensory score by multiplying the four major sensory factors by respective weighted values and summating the four major sensory factors multiplied by the respective weighted values; and
   using the total sensory score to apply shift control.

2. The evaluation method of claim 1, wherein each of the calculating of the four major sensory factors and the obtaining of the total sensory score is performed per a sporty kick down and a mild kick down of a driver, wherein the sporty kick down and the mild kick down are distinguished by a rate of change in an accelerator pedal sensor signal.

3. The evaluation method of claim 2, wherein when the rate of change in the accelerator pedal sensor signal exceeds to 250%±50%/seconds (sec), it is determined as the sporty kick down, and when it is 250%±50%/seconds (sec) or less, it is determined as the mild kick down.

4. The evaluation method of claim 2, wherein among the four major sensory factors, the responsiveness indicate whether a vehicle responds as rapidly as a driver's willing, the strength indicates whether a power feeling is enough when the vehicle accelerates, the smoothness indicates whether an acceleration rising is smooth, and the unperceivable indicates whether there is no unpleasant vibration when a vehicle accelerates.

5. The evaluation method of claim 2, wherein among the six measurement factors, the initial acceleration response time X1 is a time required T1 from an acceleration at a tip-in time point where a driver steps down an acceleration pedal to a time point where the acceleration is increased to a predetermined rate, the final acceleration arriving time X2 is a time required T2 from the tip-in time point of a driver to a time required to arrive a maximum acceleration, the average acceleration maintaining amount during a predetermined time period after arriving a maximum acceleration X3 is an acceleration average value G1 for a predetermined time period after arriving the maximum acceleration, the acceleration rising slop X4 is an acceleration slope G from T1 to T2, the initial maximum jerk X5 is a first effective peak jerk after tip-in of a driver, and the end maximum jerk X6 is an effective peak jerk after T2.

6. The evaluation method of claim 5, wherein the predetermined rate at which the acceleration increases from the acceleration at the tip-in time point, which is necessary to determine the initial acceleration response time X1, is a range of 0.02±0.01 of the acceleration at a tip-in time point, and the predetermined time period, which is necessary to determine the average acceleration maintaining amount X3 during a predetermined time period after arriving a maximum acceleration is a range of 0.5±0.2 second (sec) after 150±50 milliseconds (ms) after arriving the maximum acceleration.

* * * * *